Nov. 24, 1936.  R. E. MILLER  2,061,916
REMOTE CONTROLLED BRAKE
Filed Sept. 18, 1935
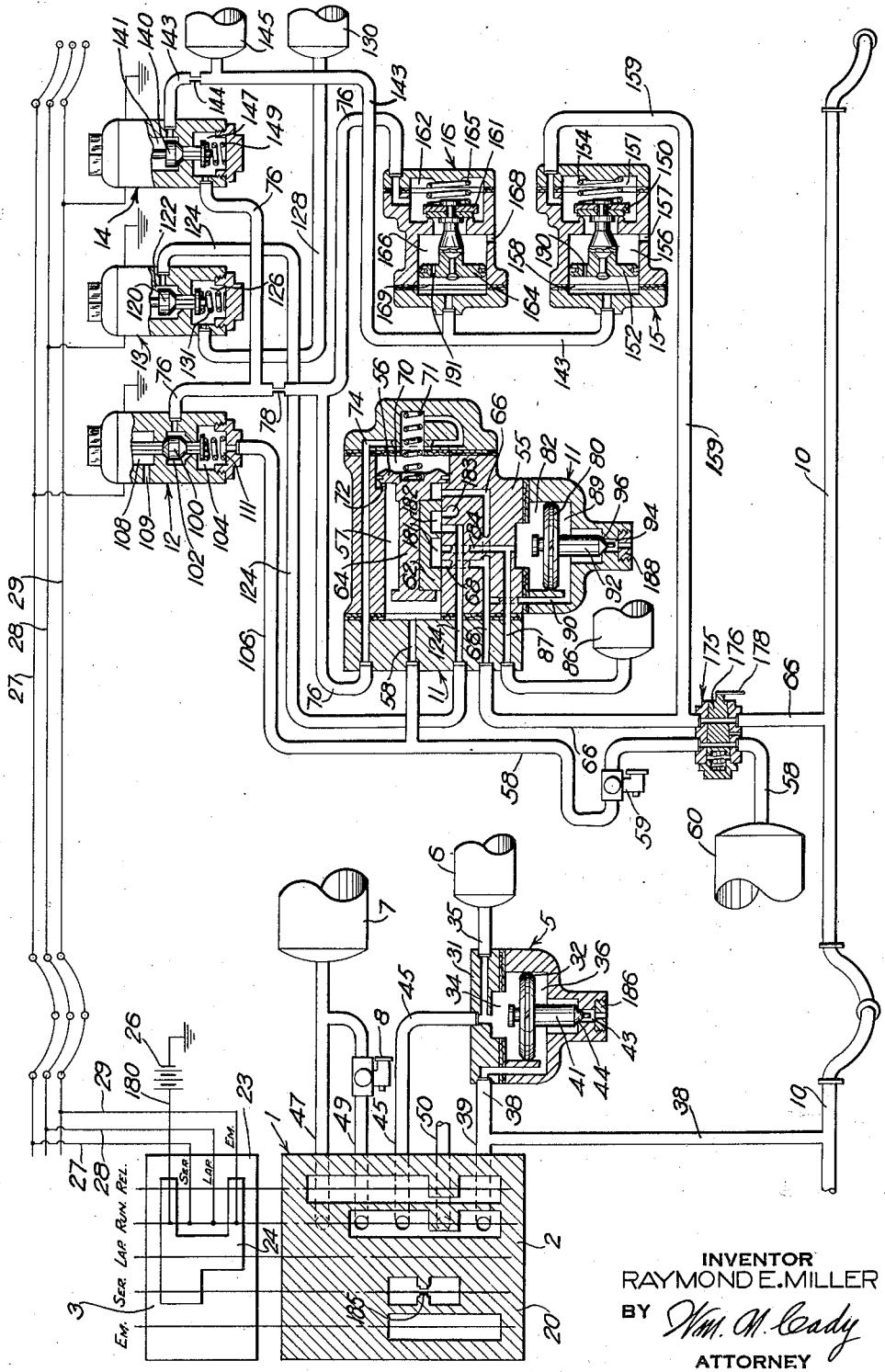
INVENTOR
RAYMOND E. MILLER
BY Wm. M. Cady
ATTORNEY Patented Nov. 24, 1936

2,061,916

UNITED STATES PATENT OFFICE

2,061,916

REMOTE CONTROLLED BRAKE

Raymond E. Miller, Wilkinsburg, Pa., assignor to The Westinghouse Air Brake Company, Wilmerding, Pa., a corporation of Pennsylvania Application September 18, 1935, Serial No. 41,011

27 Claims. (Cl. 303—15)

This invention relates to train brakes and more particularly to remote controlled means for varying the pressure of the fluid in the brake pipe for controlling the brakes of a train.

In a train equipped with the usual fluid pressure brake apparatus, the brakes are adapted to respond to variations in brake pipe pressure to effect the application and the release of the brakes. In order to apply the brakes the engineer on the locomotive operates the usual brake valve device to vent fluid under pressure from the brake pipe on the train, and in order to effect a release of the brakes after an application the brake valve device is operated to supply fluid under pressure to the brake pipe. It is evident that a reduction in brake pipe pressure and an increase in brake pipe pressure is effective at the front of the train, and then becomes effective serially from car to car towards the rear of the train, thereby causing a serial application of the brakes and a serial release of the brakes.

There is a certain amount of slack between the cars of a train which tends to be gathered toward the front of the train when the brakes are serially applied, and tends to permit the front portion of the train to run away from the rear portion of the train in effecting a release of the brakes after an application. In relatively short trains this change in slack condition does not materially affect the braking of the train, but in long trains, where the amount of slack is great and the time required to obtain an application of the brakes at the rear end of the train is quite long, the gathering of the slack toward the front of the train develops such force as to produce severe and damaging shocks, and especially in view of the fact that there is an ever increasing tendency to operate longer trains it is becoming correspondingly more difficult to control the train brakes in such a manner as to prevent such shocks.

Brake systems have heretofore been developed to obviate the above condition by providing electrically controlled means on one or more cars in the train remote from the locomotive, such as on a car at the rear of the train, and operated simultaneously with the engineer's brake valve device on the locomotive for varying the pressure of the fluid in the brake pipe. The remote unit is electrically controlled in accordance with the operation of the engineer's brake valve device to simultaneously vary the brake pipe pressure at the remote unit in accordance with the variations in the brake pipe pressure effected at the locomotive by operation of the engineer's brake valve device.

A brake system incorporating these features is shown in U. S. Patent 1,972,747, issued September 4, 1934, to myself and Thomas W. Masterman.

In the braking system shown in this patent the remote unit includes a magnet valve which controls the supply of fluid to and the release of fluid from the brake pipe, and the winding of this magnet valve is normally deenergized, while the valve is biased to a position to effect the supply of fluid to the brake pipe.

On movement of the engineer's brake valve device to the service application position the supply of fluid to the brake pipe by operation of the engineer's brake valve device is cut off, and at the same time fluid is released from the brake pipe, while a circuit is established through the winding of the magnet valve of the remote unit and this valve is thereupon moved to a position to cut off the supply of fluid to the brake pipe and also open a communication through which fluid is released from the brake pipe to the atmosphere.

There is a possibility that in the operation of this system, when the engineer's brake valve device is turned to the service application position, in which position the supply of fluid under pressure through the engineer's brake valve device to the brake pipe is cut off, and fluid is released from the brake pipe to initiate an application of the brakes at the forward end of the train, that the magnet valve in the remote unit will not be energized or will not operate to cut off the supply of fluid to the brake pipe at the rear of the train, with the result that fluid will continue to be supplied to the brake pipe at the rear of the train, thus maintaining the pressure of the fluid in the brake pipe in this portion of the train and preventing an application of the brakes on the cars in this portion of the train.

As the brakes on the cars in the forward portion of the train will be applied as a result of the reduction in the pressure of the fluid in this portion of the brake pipe by operation of the engineer's brake valve device, and as the brakes on the cars at the rear of the train will remain released through the continued supply of fluid to the brake pipe by operation of remote unit, there will be a rapid run-in of the slack in the train so as to produce severe and damaging shocks.

It is the principal object of this invention to provide an improved braking system of the type described in which the remote unit is electrically controlled and is operated simultaneously with the engineer's brake valve device on the locomotive, and which incorporates means automatically operable to cut off the supply of fluid to the brake pipe by the remote unit in the event of failure of the electrically operated portions of the remote unit to operate to cut off the supply of fluid to the brake pipe on movement of the engineer's brake valve device to the brake application position.

A further object of the invention is to provide an improved braking system of the type described in which the remote unit is electrically controlled and is operated simultaneously with the engineer's brake valve device on the locomotive, and which incorporates means automatically operable to cut off the supply of fluid to the brake pipe by the remote unit in the event of failure of the electrically operated portions of the remote unit to operate to cut off the supply of fluid to the brake pipe on movement of the engineer's brake valve device to the brake application position, and which also operates to release fluid from the brake pipe at an emergency rate.

Other objects of the invention and features of novelty will be apparent from the following description taken in connection with the accompanying drawing, the single figure of which is a diagrammatic view of a brake equipment embodying my invention.

Referring to the drawing I have illustrated only those parts of the system which are essential to the operation and understanding of the improved braking system provided by this invention, and certain of the elements employed in this system and shown diagrammatically, as well as elements which may be employed in connection with the system shown in this application, are illustrated and described in detail in the above referred to U. S. Patent 1,972,747.

As shown in the drawing, the locomotive brake equipment comprises an engineer's brake valve device represented in the drawing by the diagram lay-out 1, and having a pneumatic portion 2 and an electric portion 3. The locomotive equipment includes, in addition, an equalizing discharge valve mechanism 5, an equalizing reservoir 6, a main reservoir 7, and a feed valve device 8.

The equipment on the remote or control car comprises a service application and release valve device 11, a service application and release magnet valve device 12, a lap magnet valve device 13, an emergency magnet valve device 14, a brake pipe vent valve device 15, and a vent valve device 16.

The engineer's brake valve device is illustrated diagrammatically in the drawing, and the pneumatic portion 2 comprises a rotary valve 20 having ports therein, and, as will hereinafter more fully appear, controlling the supply of fluid from the main reservoir 7, and the feed valve device 8, to the brake pipe 10 and to the equalizing discharge valve device 5, and also has ports which control the release of fluid under pressure from the equalizing discharge valve device 5, and from the brake pipe 10.

The electric portion 3 of the engineer's brake valve device 1 comprises a drum 23, which is rotated in accordance with rotation of the rotary valve 20 of the pneumatic portion of the brake valve device, and which has mounted thereon a contact 24, which in different positions of the brake valve device, as will hereinafter more fully appear, is adapted to complete and interrupt circuits between a suitable source of electric energy, such as a battery 26, and the control wires 27, 28, and 29.

The equalizing discharge valve device 5 comprises a casing 31 having a bore therein in which is positioned the equalizing piston 32, having on one side thereof a chamber 34, which is connected by way of a passage and pipe 35 with the equalizing reservoir 6. The piston 32 has on the other side thereof a chamber 36, which is connected by way of a passage and pipe 38 with the brake pipe 10, and by way of a pipe 39 with a port in the seat of the rotary valve 20. The piston 32 has associated therewith a valve 41 which controls communication between the chamber 36 and the atmosphere by way of a passage 43, and which is adapted to seat upon a seat 44 surrounding the passage 43 so as to cut off communication between the chamber 36 and the atmosphere.

The chamber 34 on the upper side of the piston 32 is also connected with a port in the seat of the rotary valve 20 by way of a pipe 45, while the main reservoir is connected with a port in the seat of the rotary valve 20 by way of a pipe 47, and the feed valve 8 is connected to a port in the seat of the rotary valve 20 by way of a pipe 49. In addition, the seat of the rotary valve 20 has an atmospheric exhaust port associated therewith and having a pipe 50 connected thereto.

The service application and release valve device 11, which is mounted on the control car, comprises a casing 55 having a bore therein in which is mounted a piston 56 having at one side thereof a valve chamber 57, which is constantly connected by way of a passage and pipe 58 with a feed valve 59 which is supplied with fluid under pressure from a suitable source, such as a reservoir 60. The valve chamber 57 has mounted therein a slide valve 62 which is adapted to be operated by the piston 56 through the medium of the piston stem 64.

The brake pipe 10 is connected with a port in the seat of the slide valve 62 by way of a passage and pipe 66, which has a branch passage 68 associated therewith and communicating with a port in the seat of the slide valve 62.

The piston 56 has on the opposite side thereof a chamber 70, in which is mounted a spring 71 and which urges the piston 56 into engagement with a stop 72, while the chamber 70 is constantly connected by way of a passage 74 and a branched pipe 76 with the vent valve device 16, and through the choke 73 with the service application and release valve device 12 and with the emergency magnet valve device 14.

The service application and release valve device 11 also includes the usual equalizing discharge valve mechanism, and which, as shown, comprises an equalizing piston 80 having at one side thereof a chamber 82 which is connected with a port in the seat of the slide valve 62 by way of a passage 84, and is connected with an equalizing reservoir 86 by way of a passage and pipe 87. The piston 80 has on the other side thereof a chamber 89, which is connected with the brake pipe by way of a passage 90, which communicates with the passage 66, while the piston 80 has a valve 92 secured thereto and controlling communication between the chamber 89 and the atmosphere by way of a passage 94. The valve 92 is adapted to seat upon a seat 96 formed on the body of the valve device and surrounding the passage 94 to cut off communication between the chamber 89 and the atmosphere.

The service application and release magnet valve device 12 comprises a double beat valve 100 positioned in a valve chamber 102 to which is connected one branch of the branched pipe 76. This valve device also has formed therein a chamber 104 which is supplied with fluid under pressure from the feed valve 59 by way of a pipe 106 which connects with the pipe 58. In addition the valve 12 has a release chamber 108 formed therein which is in constant communication with the atmosphere by way of a passage 109.

The valve 100 is normally urged to its upper seated position by means of a spring 111 mounted in the chamber 104, so as to cut off communication between the chamber 102 and the release chamber 108, and to permit communication between the chamber 104 and the chamber 102.

This valve device has a winding associated therewith and operable when energized to urge the valve 100 to its lower seated position so as to cut off communication between the chamber 104 and the chamber 102, and to permit communication between the chamber 102 and the release chamber 108, and thereby with the atmosphere.

The lap magnet valve device 13 has a valve 120 positioned in a valve chamber 122, which is connected by way of a pipe and passage 124 with a port in a seat of the slide valve 62 of the service application and release valve device 11.

The lap magnet valve device 13 has, in addition, a chamber 126 formed therein and which is connected by way of a pipe 128 with a reduction limiting reservoir 130. The valve 120 is normally urged to its upper or open position by means of a spring 131, and is urged downwardly to its seated position by means of the winding of the magnet valve device upon energization thereof to cut off communication between the chamber 126 and the chamber 122.

The emergency magnet valve device 14 has a valve 140 positioned in a chamber 141, which is connected by way of a pipe 143, having a choke or restricted portion 144 interposed therein, with a volume reservoir 145, and with the brake pipe vent valve device 15 and the vent valve device 16. The emergency magnet valve device 14 also has a chamber 147 formed therein which has one branch of the pipe 76 connected thereto. The valve 140 is urged to its upper or open position by means of a spring 149, and is urged to its lower or seated position, which is the position in which it is shown in the drawing, upon energization of the winding of the magnet valve device.

One terminal of the winding of the service application and release magnet valve device 11 is connected to the wire 27; one terminal of the winding of the lap magnet valve device 13 is connected to the wire 28; while one terminal of the winding of the emergency magnet valve device 14 is connected to the wire 29. The other terminal of the windings of each of the magnet valve devices is connected to ground.

The brake pipe vent valve device 15 comprises a vent valve 150, contained in a chamber 151, and a piston 152 for unseating said valve, a spring 154 being provided in the chamber 151 for urging the vent valve 150 to its seat. The piston 152 has at one side a chamber 156 connected to the atmosphere by way of a passage 157, and at the opposite side a chamber 158 connected to the emergency magnet valve device by way of the pipe 143.

The chamber 151 of the brake pipe vent valve device 15 is connected to the brake pipe 10 by way of a pipe 159, which communicates with the pipe 66, and thereby with the brake pipe 10.

The vent valve device 16 comprises a vent valve 161 contained in a chamber 162 to which is connected one branch of the branched pipe 76, and a piston 164 for unseating said vent valve, a spring 165 being provided to urge said vent valve to its seat. The piston 164 has at one side thereof a chamber 166, which is constantly connected to the atmosphere by way of a passage 168, and has at the opposite side a chamber 169 which is connected to the emergency magnet valve device 14 by means of the pipe 143.

The remote unit also is supplied with a cock 175 which controls communication through the brake pipe branch pipe 66 and the pipe 58 leading from the supply reservoir 60. The cock 175 comprises a plug valve 176 having a handle 178 associated therewith for turning the plug valve from its cut-in position, in which it is shown in the drawing, to the cut-out position in which position communication through the pipes 66 and 58 is cut off, so that if for any reason the apparatus on the control car should be rendered inoperative, the remote unit can be cut off from the brake pipe and will therefore have no control over the pressure of the fluid in the brake pipe.

In operation, assuming that the engineer's brake valve device is turned to the release position, fluid under pressure is supplied from the main reservoir 7 through the pipe 47 to a port in the seat of the rotary valve 20, and flows through a port in the rotary valve 20 to the pipe 45 which communicates with the chamber 34 on one side of the equalizing piston 32 and with the equalizing reservoir 6.

Fluid also flows from the pipe 47 through a port in the rotary valve 20 to the pipe 39, from which it flows by way of the pipe 38 to the chamber 36 on the lower side of the equalizing piston 32, and also to the brake pipe 10.

The pressure on the opposite sides of the equalizing piston 32 will be substantially equal, and the piston 32 will be held in the position in which it is shown in the drawing, in which position the valve 41 is in engagement with the seat 44 so as to cut off the escape of fluid from the brake pipe by way of the passage 43.

When the engineer's brake valve device is in the release position the contact 24 on the drum 23 of the electric portion of the brake valve device establishes a circuit between a wire 180, which is connected to one side of the battery 26, and the wire 29, which is connected to the winding of the emergency magnet valve device on the control car. When a circuit is established through the winding of the emergency valve device 14 the valve 140 of this valve device is urged downwardly against the spring 149 so as to move the valve into engagement with its seat to cut off communication between the chamber 147 and the chamber 141, which is the position in which the valve is shown in the drawing.

In this position of the engineer's brake valve device the contact 24 of the electric portion 3 of the brake valve device interrupts the circuits through the wires 27 and 28 so that the windings of the service application and release magnet valve device 12 and the lap magnet valve device 13 are deenergized, and the valve 100 of the service application and release magnet valve device 12, and the valve 120 of the lap magnet valve device 13 are moved to the positions in which they are shown in the drawing by the springs associated therewith.

Fluid from the reservoir 60 on the control car thereupon flows by way of the pipe 58, through the feed valve 59 to the valve chamber 57 of the service application and release valve device 11, and by way of the pipe 106 to the chamber 104 in the service application and release magnet valve device 12. As the valve 100 of this magnet valve device is in its upper position at this time fluid flows from the chamber 104 to the chamber 102 and therefrom to the branched pipe 76. Fluid which is supplied to this pipe flows to the chamber 147 in the emergency magnet valve device 14, but as the valve 140 is held in its lower or seated position at this time because of the energization of the winding of the emergency magnet valve device, fluid is not permitted to flow from the chamber 147 to the chamber 141.

The fluid which is supplied to the pipe 76 from the chamber 102 also flows through the choke or restricted passage 73, to the passage 74 in the service application and release valve device 11, and thence to the chamber 70 on the spring side of the piston 56. As the pressure in the valve chamber 57, and in the chamber 70, will be substantially equal at this time, the piston 56 will be moved by the spring 71 into engagement with the stop 72, which is the position in which it is shown in the drawing.

Fluid from the chamber 102 also flows by way of the pipe 76 to the chamber 162 in the vent valve device 16, but as the valve 161 is in engagement with its seat at this time fluid cannot escape from this chamber to the atmosphere.

When the slide valve 62 is in the position in which it is shown in the drawing fluid which is supplied to the valve chamber 57 in the service application and release valve device 11 flows by way of the passage and pipe 66 to the brake pipe 10, and also by way of the passage 90 to the chamber 89 on the lower side of the equalizing piston 80. In addition, fluid flows by way of the passage 68 and the cavity 181 in the slide valve 62 to the passage 84, which communicates with the chamber 82 on the upper side of the equalizing piston 80, and by way of a passage 87 with the equalizing reservoir 86. As the pressures on the opposite sides of the equalizing piston 80 are substantially equal at this time the valve 92 will be maintained in engagement with the seat 96 so as to cut off the release of fluid from the brake pipe to the atmosphere by way of the passage 94.

When the slide valve 62 is in the position in which it is shown in the drawing the passage 124 is connected by means of a cavity 182 in the slide valve with an atmospheric exhaust passage 183 so that fluid is released from the passage and pipe 124, and also from the reservoir 130, as the valve 120 of the lap magnet valve device 13 is maintained in its upper or open position to permit communication between the chamber 126 and the chamber 122.

After the engineer's brake valve device has been in the release position for a time interval, it is moved to the running position, in which position the supply of fluid from the main reservoir 7 directly to the brake pipe and to the equalizing reservoir is cut off and fluid is supplied thereto by way of the feed valve device 8 and the pipe 49 so that the brake pipe is maintained charged with fluid under pressure at the pressure supplied by the feed valve device 8.

When the engineer's brake valve device is turned to the running position the contact 24 maintains the circuit through the winding of the emergency magnet valve device, while continuing to interrupt the circuits through the windings of the service application and release magnet valve device 12 and the lap magnet valve device 13, so that the apparatus on the control car continues to be conditioned to supply fluid under pressure to the brake pipe at the pressure determined by the feed valve device 59 on the control car.

Now if the engineer desires to make a gradual reduction in brake pipe pressure to effect a service application of the brakes he turns the engineer's brake valve device from the running position to the service position, in which position the passage 49 is lapped by the rotary valve 20 so as to cut off the supply of fluid under pressure from the feed valve device 8 to the brake pipe, while the passage 39 associated with the brake pipe is also cut off by the rotary valve 20. In addition, in this position of the engineer's brake valve device a port in the rotary valve 20 establishes communication between the passage 45, which leads from the equalizing reservoir 6 and from the chamber 34 on the upper side of the equalizing piston 32, and the atmospheric exhaust passage 50 by way of a choke or restricted passage 185, so that fluid under pressure is released from the equalizing reservoir and the chamber 34 to the atmosphere at a restricted rate.

The higher brake pipe pressure in the chamber 36 on the lower side of the equalizing piston 32 then shifts the piston 32 upwardly and unseats the valve 41, so that fluid under pressure is permitted to flow from the brake pipe by way of the pipe and passage 38 to the chamber 36 and therefrom to the atmosphere by way of the passage 43, which may have a choke plug 186 interposed therein to control the rate of reduction in brake pipe pressure.

In the service position of the engineer's brake valve device the contact 24 is moved out of engagement with the contact associated with the wire 29, which leads to the winding of the emergency magnet valve device, so that the winding of this valve device is deenergized, while the contact 24 is moved to a position in which it engages the contact associated with the wire 27 which leads to the winding of the service application and release magnet valve device 12, thereby establishing a circuit through this winding.

On energization of the winding of the service application and release magnet valve device 12 the valve 100 is moved downwardly against the spring 111 so as to cut off communication between the chamber 104 and the chamber 102, and thus cut off the flow of fluid under pressure from the reservoir 60 to the pipe 76. At the same time communication is permitted between the chamber 102 and the chamber 108 so as to permit the fluid in the pipe 76 to escape to the atmosphere by way of the passage 109.

When fluid is released from the pipe 76 fluid will also be released from the chamber 70 on the spring side of the piston 56, and the piston 56 will be forced to the right against the spring 71 by the pressure of the fluid in the valve chamber 57.

By this movement of the piston 56 the slide valve 62 will be moved to the right so that the cavity 181 no longer establishes communication between the passages 68 and 84, but establishes communication between the passage 84 and the passage 124, while the slide valve cuts off communication between the valve chamber 57 and the passage 66. Fluid from the chamber 82 on the upper side of the equalizing piston 80, and in the equalizing reservoir 86 will thereupon be permitted to flow by way of the passage 124 to the chamber 122 in the lap magnet valve device 13, past the open valve 120 to the chamber 126, and therefrom by way of the pipe 128 to the reduction limiting reservoir 130.

On the reduction in the pressure of the fluid in the chamber 82 the higher brake pipe pressure in the chamber 89 on the lower side of the equalizing piston 88 will force the piston 80 upwardly, thereby unseating the valve 92 and permitting fluid under pressure from the brake pipe 10 to flow to the atmosphere by way of the pipe and passage 66 and the passage 90, the chamber 89, and thence to the atmosphere by way of the passage 94, which may have a choke plug 188 interposed therein to control the rate of reduction in brake pipe pressure.

It will be seen that since the winding of the service application and release magnet valve 12 is energized immediately upon movement of the engineer's brake valve device to the service position, the service application and release valve device 1 will promptly operate to effect a service reduction in brake pipe pressure at the control car at substantially the same time as the service reduction in brake pipe pressure is effected at the front end of the train by operation of the engineer's brake valve device.

As the winding of the emergency magnet valve device 14 is deenergized while the engineer's brake valve device is in the service position, the valve 140 will be moved to its upper or open position by the spring 149, and any fluid under pressure present in the pipe 143 and in the reservoir 145 is permitted to flow to the chamber 141, past the valve 140 to the chamber 147 and therefrom through the pipe 76 to the chamber 102 in the service application and release magnet valve 12, and from this chamber to the chamber 108 and to the atmosphere by way of the passage 109.

Fluid under pressure in the pipe 143 and the reservoir 145 is also permitted to escape to the atmosphere by way of vent passages 190 and 191 in the pistons 152 and 164 of the vent valve devices 15 and 16 respectively so that the pipe 143 and the reservoir 145 are normally maintained at atmospheric pressure during a service application of the brakes.

A full service reduction in brake pipe pressure may be effected or the degree of reduction may be limited to any desired amount less than a full service reduction. In either case, when the desired degree of brake pipe reduction is obtained the engineer's brake valve device is turned from the service position to the lap position, in which the rotary valve 20 cuts off communication between the pipe 45 and the atmospheric exhaust passage 50, and also cuts off communication between the other ports in the seat of the rotary valve. This prevents a further reduction in the pressure of the fluid in the chamber 34 and in the equalizing reservoir 6. The brake pipe pressure acting on the opposite side of the equalizing piston 32 then continues to reduce past the discharge valve 41 until the pressure in the chamber 36, and in the brake pipe 10, is slightly below the pressure in the chamber 34 at which time the piston 32 operates in the usual manner to seat the discharge valve 41 and prevent the further flow of fluid under pressure from the brake pipe to the atmosphere.

In the lap position of the engineer's brake valve device the contact 24 establishes a circuit between the wire 180 leading from the battery 26, and the wires 27, 28 and 29 leading to the windings of the magnet valve devices on the control car. The winding of the service application and release magnet valve device 12, therefor, remains energized so that the valve element 100 is maintained in its lower seated position to cut off the flow of fluid from the chamber 104 to the pipe 76, and to establish communication between the pipe 76 and the atmosphere.

On movement of the engineer's brake valve device to the lap position the winding of the lap magnet valve device 13 will be energized and the valve 120 will be moved to its lower seated position so as to cut off communication between the chamber 126 and the chamber 122, and thus prevent the further venting of fluid from the equalizing discharge valve piston chamber 82 and the connecting reservoir 86 to the reduction limiting reservoir 130.

Fluid will continue to be vented from the brake pipe 10 past the discharge valve 92, however, until the brake pipe pressure acting in piston chamber 89 is reduced slightly below the pressure of the fluid in the chamber 82 on the opposite side of equalizing piston 80, at which time the piston 80 will be operated to seat the discharge valve 92 in the usual manner.

The reduction in brake pipe pressure may be effected in steps, if desired, by moving the brake valve device first to service position, then to lap position and repeating this operation. The lap magnet valve device 13 on the remote unit will operate simultaneously with the movement of the brake valve device and permit a reduction in brake pipe pressure to be effected at the rear of the train in steps equal in amount to the steps of reduction effected by operation of the engineer's brake valve device at the front end of the train.

The reduction in equalizing reservoir pressure on the remote unit is limited to equalization with the reduction limiting reservoir, which, however, is preferably of such volume as to permit a full service reduction in brake pipe pressure.

If it is desired to charge the brake pipe and to effect a release of the brakes after a service application, the engineer's brake valve device is turned first to the release position, and then to the running position. In the release position of the engineer's brake valve device fluid is supplied directly from the main reservoir 7 by way of the pipe 47 and the ports in the rotary valve 20 to the brake pipe 10, and to the chamber 34 in the equalizing discharge valve device 5 and the equalizing reservoir 6, while in the running position of the engineer's brake valve device fluid is supplied from the main reservoir 7 by way of the feed valve device 8 and the passage 49.

In the release position of the engineer's brake valve device the contact 24 establishes a circuit between the wire 180 leading from the battery 26, and the wire 29 leading to the winding of the emergency magnet valve device 14 on the remote unit, while the circuits through the windings of the other magnet valve devices are interrupted. As a result of the interruption of the circuit through the winding of the service application and release magnet valve device 12 the valve 100 is moved to its upper seated position by the spring 111, so as to cut off communication between the pipe 76 and the atmosphere, and to establish communication between the pipe 106 and the pipe 76 so that fluid is permitted to flow from the reservoir 60 by way of the pipes 58 and 106 to the chamber 104 and therefrom to the chamber 102 which has the pipe 76 connected thereto.

Fluid which is supplied to the pipe 76 flows by way of this pipe through the restricted portion or choke 78 to the passage 74 in the service application and release valve device 11 from which passage it flows to the chamber 70 on the spring side of the piston 56, and on equalization of the pressure of the fluid in the chamber 70 with that in valve chamber 57 on the opposite side of piston 56, the piston 56 is moved by the spring 71 into engagement with the stop 72, thereby moving the slide valve 62 to the position in which it is shown in the drawing.

In this position of the slide valve 62 the cavity 181 establishes communication between the passage 68, which leads from the brake pipe 66, and the passage 84 which communicates with the chamber 82 on the upper side of the piston 80, and with the equalizing reservoir 86, and at the same time the end of the slide valve 62 uncovers the end of the passage 66, so that fluid under pressure from the valve chamber 57 flows by way of the passage 66 to the brake pipe, again charging the brake pipe with fluid under pressure. In this position of the slide valve 62 the cavity 182 establishes communication between the passage 124 and the atmospheric passage 183, thus permitting fluid from the reduction limiting reservoir 130 to escape past the open valve 120 in the lap magnet valve device 13 to the atmosphere by way of the passage 124, cavity 182, and the atmospheric exhaust passage 183.

In the release or running position of the engineer's brake valve the winding of the emergency magnet valve device 14 is energized so that the valve 140 is moved into engagement with its seat to cut off communication between the pipe 76 and the pipe 143.

If the engineer desires to effect an emergency application of the brakes he turns the brake valve device to the emergency position, in which position the ports in the rotary valve 20 connect the brake pipe 38 to the atmospheric exhaust passage 50 so as to release fluid directly from the brake pipe to the atmosphere.

In the emergency position of the engineer's brake valve device the ports in the rotary valve 20 also connect the pipe 45 leading from the chamber 34 of the equalizing discharge valve device 5 and the equalizing reservoir 6 to the atmosphere, and the higher brake pipe pressure on the opposite side of the equalizing piston 32 quickly moves this piston upwardly so that the valve 41 is moved away from the seat 44 to permit fluid to escape from the brake pipe 10 to the atmosphere by way of the passage 43.

In addition when the engineer's brake valve device is turned to the emergency position the contact 24 of the electric portion 3 of the brake valve device is moved out of engagement with the contact associated with the wire 180 leading from the battery 126, and also out of engagement with the wires 27, 28 and 29 so that the windings of the magnet valve devices on the remote unit are deenergized.

As the winding of the service application and release magnet valve device 12 is deenergized the valve 100 is held by the spring 111 in its upper seated position so as to cut off the release of fluid from the pipe 76 to the atmosphere and to permit fluid to flow from the pipe 106 to the pipe 76.

As the winding of the lap magnet valve device 13 is deenergized the valve 120 is held in its upper or open position by the spring 131 so as to permit fluid to flow from the passage and pipe 124 and the service application and release valve device 11 to the reduction limiting reservoir 130.

The winding of the emergency magnet valve device 14 will also be deenergized at this time and the valve 140 will be moved to its upper or open position by the spring 149, so as to permit fluid to flow from the pipe 76 to the chamber 141 and therefrom to the pipe 143. Fluid which is supplied to the pipe 143 flows through the choke or restricted portion 144 to the reservoir 145, and also to the chamber 169 in the vent valve device 16 and to the chamber 158 of the brake pipe vent valve device 15. The continued flow of fluid to the pipe 143 through the choke 144 causes the pressure of the fluid in the reservoir 145 to increase, and causes a similar increase in the pressure of the fluid in the chambers 158 and 169 of vent valve devices 15 and 16, respectively.

When the pressure of the fluid in the chamber 158 of the brake pipe vent valve device 15 has increased to a predetermined value the piston 152 will be moved to the right, and will move the valve 150 away from its seat against the spring 154, thereby opening a communication between the chamber 151 and the atmosphere, thus permitting fluid to be released from the brake pipe 10 to the atmosphere by way of the pipe 159, the chamber 151, the chamber 155 and exhaust passage 157.

Similarly, when the pressure of the fluid in the chamber 169 has increased to a predetermined value, the piston 164 will be shifted to the right and will move the valve 161 away from its seat against the spring 165 so that fluid from the chamber 162 escapes to the atmosphere by way of the chamber 166 and the exhaust passage 168.

The chamber 162 has one branch of the pipe 76 connected thereto, and on the release of fluid under pressure from the chamber 162, fluid will also be released from the chamber 70 of the service application and release valve device 11, which chamber is in constant communication with the chamber 162 of the vent valve device 16 by way of the passage 74 and the pipe 76.

Fluid will continue to be supplied from the service application and release magnet valve 12 to the pipe 76, and will flow through the choke 78 to the portions of the pipe 76 which communicate with the service application and release valve device 11 and with the vent valve device 16. The rate of flow of fluid through the choke 78 is substantially less than the rate at which fluid is released from this portion of the pipe 76 through the vent valve device 16, with the result that there will be a rapid reduction in the pressure of the fluid in the chamber 70 of the service application and release valve device 11 when the valve 161 of the vent valve 16 is moved away from its seat.

On the release of fluid under pressure from the chamber 70 of the service application and release valve device, the piston 56 will be moved against the spring 71 by the pressure of the fluid in the valve chamber 57 and the slide valve 62 will be moved to a position to cut off the supply of fluid to the brake pipe from the valve chamber 57 by way of the passage 66, and the cavity 181 of the slide valve 62 will establish communication between the passage 84 and the passage 124 to release fluid from the chamber 82 on the upper side of the equalizing piston 80 and from the equalizing reservoir 86.

Fluid under pressure which is supplied to the chamber 158 of the brake pipe vent valve device 15 will be released to the atmosphere at a restricted rate by way of a restricted passage 190 extending through the piston 162, while fluid which is supplied to the chamber 169 of vent valve device 16 will escape to the atmosphere at a restricted rate through the passage 191 extending through the piston 164 of this valve device. The combined flow capacity of the restricted passages 190 and 191 is preferably less than that of the flow capacity of the choke or restricted passage 144, so that fluid under pressure will be supplied to the pipe 143 and to the reservoir 145 somewhat more rapidly than it is released therefrom, with the result that pressure will be permitted to build up in this pipe and reservoir. This pressure will be maintained as long as the winding of the emergency magnet valve device 14 remains deenergized so that fluid under pressure is supplied to the pipe 143.

On the energization of the winding of the emergency magnet valve device 14 the valve 140 will be moved into engagement with its seat so as to cut off the supply of fluid under pressure to the pipe 143 and the reservoir 145, and thereafter the pressure of the fluid in the pipe 143 and the reservoir 145 will be reduced due to the escape of fluid therefrom by way of the restricted passages 190 and 191, but the rate of flow of fluid through these passages is such that a substantial time interval will elapse before the pressure of the fluid in the pipe 143, the reservoir 145 and in the chambers 158 and 169 is reduced to a value which permits the springs 164 and 165 associated with the valve elements 150 and 161 of the vent valve devices 15 and 16, respectively, to shift these valves into engagement with their seats and cut off the release of fluid from the brake pipe 10 by way of the vent valve 15. This insures that fluid under pressure will be released from the brake pipe for a long enough period of time to insure that an emergency application of the brakes will be effected.

In order to charge the brake pipe and effect a release of the brakes after an emergency application the engineer's brake valve device is operated in the same manner as in charging the brake pipe after a service reduction in brake pipe pressure.

The brake system provided by my invention incorporates means automatically operable to release fluid from the brake pipe at an emergency rate, and to condition the equipment on the control car to cut off the flow of fluid to the brake pipe in the event of failure of the equipment on the control car to operate in the normal manner to cut off the supply of fluid to the brake pipe on movement of the engineer's brake valve device to the service application position.

On movement of the engineer's brake valve device to the service position fluid under pressure will be released from the brake pipe at the locomotive in the manner more fully described above, while the contact 24 will be moved to a position to interrupt the circuit through the winding of the emergency magnet valve device 14, and to normally establish a circuit through the winding of the service application and release magnet valve device 12.

As the winding of the emergency magnet valve device 14 is deenergized the valve 140 will be moved to its upper or open position by the spring 149, thereby establishing communication between the pipe 76 and the pipe 143 leading to the reservoir 145 and the vent valve devices 15 and 16.

If at this time the winding of the service application and release magnet valve device 12 is deenergized, due to a break in the wire 27, or for any other reason, or if the magnet valve device 12 fails to operate for any cause, the valve 100 will be moved to its upper seated position by the spring 111, if it is not already in this position, thereby opening communication between the chamber 104 and the chamber 102 so that fluid is permitted to flow from the pipe 106 to the chamber 104, and to the chamber 102, and thence by way of the pipe 76 to the chamber 147 of the emergency magnet valve device 14. As the valve 140 of the emergency magnet valve device 14 is in the upper or open position at this time fluid supplied to the chamber 147 is permitted to flow to the chamber 141 and therefrom to the pipe 143.

Fluid which is supplied to the pipe 143 flows through the choke 145 and causes the pressure to build up in the reservoir 145 and in the chambers 158 and 169 of the vent valve devices 15 and 16, respectively, and the vent valve device 15 thereupon operates to release fluid under pressure from the brake pipe 10 by way of the pipe 159 at an emergency rate.

The vent valve device 16 also operates to release fluid under pressure from the chamber 70 of the service application and release valve device 11 by way of the passage 74 and the pipe 76. The rate at which fluid is released from the chamber 70 by way of the vent valve device 16 exceeds the rate at which fluid is supplied to this portion of the pipe 76 from the service application and release magnet valve device 12 through the choke 78, with the result that the pressure of the fluid in the chamber 70 is reduced very rapidly, and the pressure of the fluid in the valve chamber 57 causes the piston 56 to move to the right so as to shift the slide valve 52 to a position to cut off the supply of fluid from the valve chamber 57 to the brake pipe by way of the passage and pipe 66. In addition the equalizing section of the service application and release valve device 11 operates to vent fluid under pressure from the brake pipe 10 in the manner described in detail above.

The application of the brakes resulting from the release of fluid from the brake pipe at an emergency rate will appraise the engineer of the fact that the brake equipment is not in proper working order and he can then examine the equipment to find out the cause of the trouble.

If it is desired to operate the train without using the equipment on the remote control car it is possible to do so. This may be accomplished by turning the plug valve 176 so as to cut off communication between the reservoir 60 and the feed valve 59, and to cut off communication between the brake pipe 10 and the pipes 66 and 159. Thereafter the supply and release of fluid under pressure to and from the brake pipe is controlled by means of the engineer's brake valve device on the locomotive in the usual manner.

It will be seen that the brake system provided by this invention incorporates means automatically operable to cut off the supply of fluid under pressure to the brake pipe by the means on the control car on movement of the engineer's brake valve device to a position to release fluid from the brake pipe and on failure of the electroresponsive means on the control car to operate to effect the cutting off of the supply of fluid to the brake pipe by the equipment on the control car.

While one preferred embodiment of the improved brake system provided by this invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure train brake system, in combination, a brake pipe, valve means mounted on the locomotive for supplying fluid under pressure to said brake pipe and operative to cut off the supply of fluid under pressure to said brake pipe and to release fluid under pressure from the brake pipe, electroresponsive means mounted on a car of said train for supplying fluid under pressure to the brake pipe and operative to cut off the supply of fluid to the brake pipe and to release fluid under pressure from the brake pipe, means associated with the valve means on the locomotive and operative to control the electroresponsive means in accordance with operation of said valve means, and means associated with said electroresponsive means and automatically operable to cut off the supply of fluid under pressure to the brake pipe by said electroresponsive means on failure of the said electroresponsive means to operate to effect the cutting off of the supply of fluid under pressure to the brake pipe on movement of the valve means on the locomotive to a position to cut off the supply of fluid under pressure to the brake pipe at the locomotive.

2. In a fluid pressure train brake system, in combination, a brake pipe, valve means mounted on the locomotive for supplying fluid under pressure to said brake pipe and operative to cut off the supply of fluid under pressure to said brake pipe and to release fluid under pressure from the brake pipe, electroresponsive means mounted on a car of said train for supplying fluid under pressure to the brake pipe and operative to cut off the supply of fluid to the brake pipe and to release fluid under pressure from the brake pipe, means associated with the valve means on the locomotive and operative to control the electroresponsive means in accordance with operation on said valve means, and means associated with said electroresponsive means and automatically operable to release fluid under pressure from the brake pipe on failure of the electroresponsive means to operate to effect the release of fluid from the brake pipe on movement of the valve means on the locomotive to a position to release fluid from the brake pipe at the locomotive.

3. In a fluid pressure train brake system, in combination, a brake pipe, valve means mounted on the locomotive for supplying fluid under pressure to said brake pipe and operative to cut off the supply of fluid under pressure to said brake pipe and to release fluid under pressure from the brake pipe, electroresponsive means mounted on a car of said train for supplying fluid under pressure to the brake pipe and operative to cut off the supply of fluid to the brake pipe and to release fluid under pressure from the brake pipe, means associated with the valve means on the locomotive and operative to control the electroresponsive means in accordance with operation of said valve means, and means associated with said electroresponsive means and automatically operable to cut off the supply of fluid under pressure to the brake pipe and to release fluid under pressure from the brake pipe on failure of the electroresponsive means to operate to effect the cutting off of the supply of fluid under pressure to the brake pipe on movement of the valve means on the locomotive to a position to cut off the supply of fluid under pressure to the brake pipe and to release fluid under pressure from the brake pipe at the locomotive.

4. In a fluid pressure train brake system, in combination, a brake pipe, valve means mounted on the locomotive for supplying fluid under pressure to the brake pipe and operative to cut off the supply of fluid under pressure to said brake pipe to release fluid under pressure from the brake pipe, valve means mounted on a car of said train and operable in response to variations in the pressure of the fluid supplied thereto for supplying fluid under pressure to the brake pipe and operative to cut off the supply of fluid under pressure and to release fluid under pressure from the brake pipe, electroresponsive means for supplying fluid under pressure to said valve means and operative to cut off the supply of fluid under pressure to said valve means and to release fluid under pressure from said valve means, means associated with the valve means on the locomotive and operative to control said electroresponsive means to vary the supply of fluid under pressure to and the release of fluid from the valve means on the car to operate said valve means to effect the supply and release of fluid under pressure to and from the brake pipe in accordance with the supply and release of fluid under pressure to and from the brake pipe by the valve means on the locomotive, and means responsive to the pressure of the fluid supplied to the valve means on the car and operative to cut off the supply of fluid under pressure to the brake pipe by the valve means on the car in response to a variation in said pressure operative to condition said valve means to supply fluid under pressure to the brake pipe and on movement of the valve means on the locomotive to a position to release fluid under pressure from the brake pipe.

5. In a fluid pressure train brake system, in combination, a brake pipe, valve means mounted on the locomotive for supplying fluid under pressure to the brake pipe and operative to cut off the supply of fluid under pressure to said brake pipe and to release fluid under pressure from the brake pipe, valve means mounted on a car of said train and operable in response to variations in the pressure of fluid supplied thereto to supply fluid under pressure to the brake pipe and operative to cut off the supply of fluid under pressure to the brake pipe, electroresponsive means for supplying fluid under pressure to said valve means and operative to cut off the supply of fluid under pressure to said valve means, means associated with the valve means on the locomotive and operative to control said electroresponsive means to vary the supply of fluid under pressure to the valve means on the car to operate said valve means to effect the supply of fluid under pressure to the brake pipe and the cutting off of the supply of fluid under pressure to the brake pipe in accordance with operation of the valve means on the locomotive to supply fluid under pressure to the brake pipe and to cut off the supply of fluid under pressure to the brake pipe, and means responsive to the pressure of the fluid supplied to the valve means on the car and operative to cut off the supply of fluid under pressure to the brake pipe by said valve means in response to a variation in said pressure operative to condition said valve means to supply fluid under pressure to the brake pipe and on movement of the valve means on the locomotive to a position to release fluid from the brake pipe.

6. In a fluid pressure train brake system, in combination, a brake pipe, valve means mounted on the locomotive for supplying fluid under pressure to the brake pipe and operative to cut off the supply of fluid under pressure to said brake pipe and to release fluid under pressure from the brake pipe, valve means mounted on a car of said train and operable in response to variations in the pressure of the fluid supplied thereto to release fluid under pressure from the brake pipe and operative to cut off the release of fluid under pressure from the brake pipe, electroresponsive means for supplying fluid under pressure to said valve means and operative to cut off the supply of fluid under pressure to said valve means and to release fluid from said valve means, means associated with the valve means on the locomotive and operative to control said electroresponsive means to vary the supply of fluid under pressure to the valve means on the car to effect the release of fluid under pressure from the brake pipe and the cutting off of the release of fluid under pressure from the brake pipe in accordance with operation of the valve means on the locomotive to release fluid under pressure from the brake pipe and to cut off the release of fluid under pressure from the brake pipe, and means responsive to the pressure of the fluid supplied to the valve means on the car and operative to release fluid under pressure from the brake pipe in response to a variation in said pressure operative to condition said valve means to cut off the release of fluid under pressure from the brake pipe and on movement of the valve means on the locomotive to a position to release fluid under pressure from the brake pipe.

7. In a fluid pressure train brake system, in combination, a brake pipe, valve means mounted on the locomotive for supplying fluid under pressure to the brake pipe and operative to cut off the supply of fluid under pressure to said brake pipe and to release fluid under pressure from the brake pipe, valve means mounted on a car of said train and operable in response to variations in the pressure of the fluid supplied thereto to release fluid under pressure from the brake pipe and operative to cut off the release of fluid under pressure from the brake pipe, electroresponsive means for supplying fluid under pressure to said valve means and operative to cut off the supply of fluid under pressure to said valve means and to release fluid from said valve means, means associated with the valve means on the locomotive and operative to control said electroresponsive means to vary the supply of fluid under pressure to the valve means on the car to effect the release of fluid under pressure from the brake pipe and the cutting off of the release of fluid under pressure from the brake pipe in accordance with operation of the valve means on the locomotive to release fluid under pressure from the brake pipe and to cut off the release of fluid under pressure from the brake pipe, and means responsive to the pressure of the fluid supplied to the valve means on the car and operative to release fluid under pressure from the brake pipe at an emergency rate in response to a variation in said pressure operative to condition said valve means to cut off the release of fluid under pressure from the brake pipe and on movement of the valve means on the locomotive to a position to release fluid under pressure from the brake pipe.

8. In a fluid pressure train brake system, in combination, a brake pipe, valve means mounted on the locomotive for supplying fluid under pressure to the brake pipe and operative to cut off the supply of fluid under pressure to said brake pipe and to release fluid under pressure from the brake pipe, valve means mounted on a car of said train and operable in response to variations in the pressure of fluid supplied thereto to supply fluid under pressure to the brake pipe and operative to cut off the supply of fluid under pressure to the brake pipe, electroresponsive means for supplying fluid under pressure to said valve means and operative to cut off the supply of fluid under pressure to said valve means and to release fluid under pressure from said valve means, means associated with the valve means in the locomotive and operative to control said electroresponsive means to vary the supply of fluid under pressure to the valve means on the car to operate said valve means to effect the supply of fluid under pressure to the brake pipe and the cutting off of the supply of fluid under pressure to the brake pipe in accordance with operation of the valve means on the locomotive to supply fluid under pressure to the brake pipe and to cut off the supply of fluid under pressure to the brake pipe, and means responsive to the pressure of the fluid supplied to the valve means on the car and operative in response to a variation in said pressure operative to condition said valve means to supply fluid under pressure to the brake pipe and on movement of the valve means on the locomotive to a position to cut off the supply of fluid under pressure to the brake pipe to effect a variation in the pressure of the fluid supplied to the valve means on the car to condition said valve means to cut off the supply of fluid under pressure to the brake pipe.

9. In a fluid pressure train brake system, in combination, a brake pipe, valve means mounted on the locomotive for supplying fluid under pressure to the brake pipe and operative to cut off the supply of fluid under pressure to said brake pipe and to release fluid under pressure from the brake pipe, valve means mounted on a car of said train and operable in response to variations in the pressure of the fluid supplied thereto for supplying fluid under pressure to the brake pipe, and operative to cut off the supply of fluid under pressure and to release fluid under pressure from the brake pipe, electroresponsive means for supplying fluid under pressure to said valve means and operative to cut off the supply of fluid under pressure to said valve means and to release fluid under pressure from said valve means, means associated with the valve means on the locomotive and operative to control said electroresponsive means to vary the supply and release of fluid under pressure to and from the valve means on the car to operate said valve means to effect the supply and release of fluid under pressure to and from the brake pipe in accordance with the supply and release of fluid under pressure to and from the brake pipe by the valve means on the locomotive, and means responsive to the pressure of the fluid supplied to the valve means on the car and operative in response to a variation in said pressure operative to condition said valve means to supply fluid under pressure to the brake pipe and on movement of the valve means on the locomotive to a position to release fluid from the brake pipe to effect a variation in the pressure of fluid supplied to the valve means on the car to condition said valve means to cut off the supply of fluid under pressure to the brake pipe.

10. In a fluid pressure train brake system, in combination, a brake pipe, valve means mounted on the locomotive for supplying fluid under pressure to the brake pipe and operative to cut off the supply of fluid under pressure to said brake pipe and to release fluid under pressure from the brake pipe, valve means mounted on a car of said train and operable in response to variations in the pressure of the fluid supplied thereto for supplying fluid under pressure to the brake pipe and operative to cut off the supply of fluid under pressure and to release fluid under pressure from the brake pipe, electroresponsive means for supplying fluid under pressure to said valve means and operative to cut off the supply of fluid under pressure to said valve means and to release fluid under pressure from said valve means, means associated with the valve means on the locomotive and operative to control said electroresponsive means to vary the supply and release of fluid under pressure to and from the valve means on the car to operate said valve means to effect the supply and release of fluid under pressure to and from the brake pipe in accordance with the supply and release of fluid under pressure to and from the brake pipe by the valve means on the locomotive, and means responsive to the pressure of the fluid supplied to the valve means on the car and operative in response to a variation in said pressure operative to condition said valve means to supply fluid under pressure to the brake pipe and on movement of the valve means on the locomotive to a position to release fluid under pressure from the brake pipe to effect a variation in the pressure of the fluid supplied to the valve means on the car to condition said valve means to cut off the supply of fluid under pressure to the brake pipe and to release fluid from the brake pipe.

11. In a fluid pressure train brake system, in combination, a brake pipe, valve means mounted on the locomotive or supplying fluid under pressure to said brake pipe and operative to cut off the supply of fluid under pressure to the brake pipe and to release fluid under pressure from the brake pipe, valve means mounted on a car of said train and operable in response to variations in the pressure of the fluid supplied thereto for supplying fluid under pressure to the brake pipe and operative to cut off the supply of fluid under pressure to the brake pipe and to release fluid under pressure from the brake pipe, electroresponsive means for supplying fluid under pressure to said valve means and operable to cut off the supply of fluid under pressure to the valve means and to release fluid under pressure from said valve means, means associated with the valve means on the locomotive and operative to control said electroresponsive means to vary the supply and release of fluid under pressure to and from the valve means on the car to operate said valve means to effect the supply and release of fluid under pressure to and from the brake pipe in accordance with the supply and release of fluid under pressure to and from the brake pipe by the valve means on the locomotive, other valve means on the car for releasing fluid under pressure from the brake pipe, said valve means being responsive to variations in the pressure of the fluid supplied thereto, and electroresponsive means operable on movement of the valve means on the locomotive to a position to release fluid under pressure from the brake pipe and on failure of the first named valve means on the car to cut off the flow of fluid to the brake cylinder to effect a variation in the pressure of the fluid supplied to said other valve means to condition said valve means to release fluid under pressure from the brake pipe.

12. In a fluid pressure train brake system, in combination, a brake pipe, valve means mounted on the locomotive for supplying fluid under pressure to said brake pipe and operative to cut off the supply of fluid under pressure to the brake pipe and to release fluid under pressure from the brake pipe, valve means mounted on a car of said train and operable in response to variations in the pressure of the fluid supplied thereto for supplying fluid under pressure to the brake pipe and operative to cut off the supply of fluid under pressure to the brake pipe and to release fluid under pressure from the brake pipe, electroresponsive means for supplying fluid under pressure to said valve means and operable to cut off the supply of fluid under pressure to the valve means and to release fluid under pressure from said valve means, means associated with the valve means on the locomotive and operative to control said electroresponsive means to vary the supply and release of fluid under pressure to and from the valve means on the car to operate said valve means to effect the supply and release of fluid under pressure to and from the brake pipe in accordance with the supply and release of fluid under pressure to and from the brake pipe by the valve means on the locomotive, other valve means on the car for releasing fluid under pressure from the brake pipe, said valve means being responsive to variations in the pressure of the fluid supplied thereto and being operative by the variation in pressure effective to condition the first named valve means to supply fluid under pressure to the brake pipe to release fluid from the brake pipe, and electroresponsive means controlling a passage by way of which the pressure of the fluid supplied to the second named valve means may be controlled by the electroresponsive means associated with the first named valve means, said electroresponsive means being operated to effect communication through said passage on movement of the valve means on the locomotive to a position to release fluid under pressure from the brake pipe.

13. In a fluid pressure train brake system, in combination, a brake pipe, valve means mounted on the locomotive for supplying fluid under pressure to said brake pipe and operative to cut off the supply of fluid under pressure to the brake pipe and to release fluid under pressure from the brake pipe, valve means mounted on a car of said train and operable in response to variations in the pressure of the fluid supplied thereto for supplying fluid under pressure to the brake pipe and operative to cut off the supply of fluid under pressure to the brake pipe and to release fluid under pressure from the brake pipe, electroresponsive means for supplying fluid under pressure to said valve means and operable to cut off the supply of fluid under pressure to the valve means and to release fluid under pressure from said valve means, means associated with the valve means on the locomotive and operative to control said electroresponsive means to vary the supply and release of fluid under pressure to and from the valve means on the car to operate said valve means to effect the supply and release of fluid under pressure to and from the brake pipe in accordance with the supply and release of fluid under pressure to and from the brake pipe by the valve means on the locomotive, other valve means on the car for controlling the pressure of the fluid supplied to the first named valve means, said valve means being responsive to variations in the pressure of the fluid supplied thereto and being operated to vary the pressure of the fluid supplied to the first named valve means to cut off the supply of fluid to the brake pipe by the variation in pressure effective to condition the first named valve means to supply fluid under pressure to the brake pipe, and electroresponsive means controlling a passage by way of which the pressure of the fluid supplied to the second named valve means may be controlled by the electroresponsive means associated with the first named valve means, said electroresponsive means being operated to permit communication through said passage on movement of the valve means on the locomotive to a position to release fluid under pressure from the brake pipe.

14. In a fluid pressure train brake system, in combination, a brake pipe, valve means mounted on the locomotive for supplying fluid under pressure to said brake pipe and operative to cut off the supply of fluid under pressure to the brake pipe and to release fluid under pressure from the brake pipe, valve means mounted on a car of said train and operable in responsive to variations in the pressure of the fluid supplied thereto for supplying fluid under pressure to the brake pipe and operative to cut off the supply of fluid under pressure to the brake pipe and to release fluid under pressure from the brake pipe, electroresponsive means for supplying fluid under pressure to said valve means and operable to cut off the supply of fluid under pressure to the valve means and to release fluid under pressure from said valve means, means associated with the valve means on the locomotive and operative to control said electroresponsive means to vary the supply and release of fluid under pressure to and from the valve means on the car to operate said valve means to effect the supply and release of fluid under pressure to and from the brake pipe in accordance with the supply and release of fluid under pressure to and from the brake pipe by the valve means on the locomotive, other valve means on the car for controlling the pressure of the fluid supplied to the first named valve means, said valve means being responsive to variations in the pressure of the fluid supplied thereto and being operative to vary the pressure of the fluid supplied to the first named valve means to condition said valve means to cut off the supply of fluid under pressure to the brake pipe by the variation in pressure effective to condition the first named valve means to supply fluid under pressure to the brake pipe, valve means on the car for releasing fluid under pressure from the brake pipe, said valve means being responsive to variations in the pressure of the fluid supplied thereto and being operative to release fluid under pressure from the brake pipe by the variation in pressure effective to condition the first named valve means to supply fluid under pressure to the brake pipe, and electroresponsive means controlling a passage by way of which the pressure of the fluid supplied to the second named valve means and said last named valve means may be controlled by the electroresponsive means associated with the first named valve means, said electroresponsive means being operated to permit communication through said passage on movement of the valve means on the locomotive to a position to release fluid under pressure from the brake pipe.

15. In a fluid pressure brake system, in combination, a brake pipe, variations in the pressure in which control the application and release of the brakes, valve means on the locomotive movable to a plurality of operating positions for supplying fluid under pressure to said brake pipe and operative to cut off the supply of fluid under pressure to the brake pipe and to release fluid under pressure from the brake pipe, valve means mounted on a car in said train and responsive to a given variation in the pressure of the fluid supplied thereto to effect a predetermined variation in the pressure of the fluid in the brake pipe, electroresponsive means for controlling the supply of fluid to said valve means on the car, means associated with the valve means on the locomotive and controlling the electroresponsive means on the car, said means being adapted on movement of the valve means on the locomotive to one of said operating positions to control the electroresponsive means to effect said given variation in the pressure of the fluid supplied to the valve means to effect operation of the said valve means to effect said predetermined variation in the pressure of the fluid in the brake pipe, and means adapted to effect said given variation in the pressure of the fluid supplied to said valve means and operated in response to a different variation in the pressure of the fluid supplied to said valve means and on movement of the valve means on the locomotive to a position to normally operate the electroresponsive means to effect said given variation in the pressure of the fluid supplied to the valve means on the car.

16. In an electro-pneumatic brake, in combination, a brake pipe, a valve device operated by an increase in fluid pressure for venting fluid from the brake pipe, electrically controlled valve means operated upon deenergization for supplying fluid under pressure to said valve device, and electrically controlled means operative upon energization for also effecting a venting of fluid from the brake pipe, and operative upon deenergization for establishing communication through which said first-named electrically controlled valve means supplies fluid under pressure to said valve device.

17. In an electro-pneumatic brake, in combination, a brake pipe, a valve device operated by an increase in fluid pressure for venting fluid from the brake pipe, electrically controlled valve means operated upon deenergization for supplying fluid under pressure to said valve device, a service valve device normally establishing a communication through which fluid under pressure is supplied to the brake pipe and operated upon a reduction in fluid pressure for cutting off said communication and for venting fluid from the brake pipe, and electrically controlled means operative upon energization for reducing the fluid pressure in said service valve device and for establishing communication through which said electrically controlled valve means supplies fluid to said valve device.

18. In an electro-pneumatic brake, in combination, a brake pipe, a valve device operated by an increase in fluid pressure for venting fluid from the brake pipe, electrically controlled valve means operated upon deenergization for supplying fluid under pressure to said valve device, a service valve device operated upon a reduction in fluid pressure for venting fluid from the brake pipe, electrically controlled means operative when deenergized to supply fluid under pressure to said service valve device and to said electrically controlled valve means and operative upon energization to vent fluid from said service valve device, and a vent valve device also operated by fluid supplied by operation of said electrically controlled valve means for also venting fluid from said service valve device.

19. In an electro-pneumatic brake, in combination, a brake pipe, a valve device operated by an increase in fluid pressure for venting fluid from the brake pipe, electrically controlled valve means operated upon deenergization for supplying fluid under pressure to said valve device, a service valve device operated upon a reduction in fluid pressure for venting fluid from the brake pipe, electrically controlled means operative when deenergized to supply fluid under pressure to said service valve device and to said electrically controlled valve means and operative upon energization to vent fluid from said service valve device, a vent valve device also operated by fluid supplied by operation of said electrically controlled valve means for also venting fluid from said service valve device, and a choked passage for limiting the rate at which said electrically controlled means supplies fluid to said service valve device to permit the venting of fluid therefrom by said service valve controlling vent valve device at a greater rate.

20. In an electro-pneumatic brake, in combination, a brake pipe, a valve device operated by a given variation in the pressure of the fluid supplied thereto for venting fluid from the brake pipe, electrically controlled valve means operative upon deenergization to effect said given variation in the pressure of the fluid supplied to said valve device, and electrically controlled means operative upon energization for also effecting a venting of fluid from the brake pipe and operative upon deenergization for establishing communication through which said electrically controlled valve means effects said given variation in the pressure of the fluid supplied to said valve device.

21. In an electro-pneumatic brake, in combination, a brake pipe, a valve device operated by a given variation in the pressure of the fluid supplied thereto for supplying fluid under pressure to the brake pipe and operated by a different variation in the pressure of the fluid supplied thereto to cut off the supply of fluid to the brake pipe, electrically controlled valve means operative upon deenergization to effect said given variation in the pressure of the fluid supplied to said valve device and operative upon energization to effect said different variation in the pressure of the fluid supplied to said valve device, valve means operable by said given variation in pressure for effecting said different variation in the pressure of the fluid supplied to the said valve device, and electrically controlled means operative upon deenergization for effecting said given variation in the pressure of the fluid supplied to the said valve means.

22. In a fluid pressure train brake system, in combination, a brake pipe, an engineer's valve on the locomotive for effecting the supply and release of fluid under pressure to and from the brake pipe, valve means carried by a car of the train and operative responsive to variations in the pressure of the fluid supplied thereto for venting fluid from the brake pipe, electro-responsive means controlling communication between said valve means and a chamber, an electro-responsive valve device controlling the pressure of the fluid in said chamber, and means associated with the engineer's valve on the locomotive for controlling the electro-responsive means and the electro-responsive valve device.

23. In a fluid pressure train brake system, in combination, a brake pipe, an engineer's valve on the locomotive for effecting the supply and release of fluid under pressure to and from the brake pipe, valve means carried by a car of the train and operative responsive to variations in the pressure of the fluid supplied thereto for venting fluid from the brake pipe, electro-responsive means controlling communication between said valve means and a chamber, an electro-responsive valve device controlling the pressure of the fluid in said chamber, means associated with the engineer's valve on the locomotive for controlling the electro-responsive means and the electro-responsive valve device, and means responsive to the pressure of the fluid in said chamber for supplying fluid under pressure to the brake pipe.

24. In a fluid pressure train brake system, in combination, a brake pipe, an engineer's valve on the locomotive for effecting the supply and release of fluid under pressure to and from the brake pipe, valve means carried by a car of the train and operative responsive to variations in the pressure of the fluid supplied thereto for venting fluid from the brake pipe, electro-responsive means controlling communication between said valve means and a chamber, an electro-responsive valve device controlling the pressure of the fluid in said chamber, means associated with the engineer's valve on the locomotive for controlling the electro-responsive means and the electro-responsive valve device, a supply valve device responsive to variations in the pressure of the fluid supplied thereto for supplying fluid under pressure to the brake pipe, and a communication between said supply valve device and the said chamber through which fluid may flow at a restricted rate.

25. In a fluid pressure train brake system, in combination, a brake pipe, an engineer's valve on the locomotive for effecting the supply and release of fluid under pressure to and from the brake pipe, a supply valve mounted on a car of the train and operated by variations in the pressure of the fluid supplied thereto for supplying fluid under pressure to the brake pipe, a communication between said supply valve and a chamber through which fluid may flow at a given rate, electro-responsive valve means controlling the pressure of the fluid in said chamber, valve mechanism responsive to the pressure of the fluid supplied thereto and controlling a passage which communicates with the supply valve and through which fluid may flow at a rate more rapid than said given rate, an electro-responsive valve device controlling communication between said chamber and said valve mechanism, and means associated with the engineer's valve for controlling the electro-responsive valve means and electro-responsive valve device.

26. In a fluid pressure train brake system, in combination, a brake pipe, an engineer's valve on the locomotive for effecting the supply and release of fluid under pressure to and from the brake pipe, a supply valve mounted on a car of the train and operated by variations in the pressure of the fluid supplied thereto for supplying fluid under pressure to the brake pipe, a communication between said supply valve and a chamber through which fluid may flow at a given rate, electro-responsive valve means controlling the pressure of the fluid in said chamber, valve mechanism responsive to the pressure of the fluid supplied thereto for controlling a passage which communicates with the supply valve and through which fluid may flow at a rate more rapid than said given rate, a valve device responsive to the pressure of the fluid supplied thereto for venting fluid from the brake pipe, electro-responsive valve means controlling communication between said chamber and the said valve mechanism and the said valve device, and means associated with the engineer's valve for controlling said electro-responsive valve means.

27. In a fluid pressure train brake system, in combination, a brake pipe, an engineer's valve on the locomotive for effecting the supply and release of fluid under pressure to and from the brake pipe, a supply valve mounted on a car of the train and operated by variations in the pressure of the fluid supplied thereto for supplying fluid under pressure to the brake pipe, a communication between said supply valve and a chamber through which fluid may flow at a given rate, electro-responsive valve means controlling the pressure of the fluid in said chamber, valve mechanism responsive to the pressure of the fluid supplied thereto for controlling a passage which communicates with the supply valve and through which fluid may flow at a rate more rapid than said given rate, a valve device responsive to the pressure of the fluid supplied thereto for venting fluid from the brake pipe, electro-responsive valve means controlling a communication between said chamber and said valve mechanism and said valve device through which fluid may flow only at a restricted rate, and means associated with the engineer's valve for controlling said electro-responsive valve means.

RAYMOND E. MILLER.